US007448762B2

(12) United States Patent
Su (10) Patent No.: US 7,448,762 B2
(45) Date of Patent: Nov. 11, 2008

(54) UNIVERSAL SIDEVIEW MIRROR FOR CAR (76) Inventor: Fu-Chu Su, 116, Zhengnan 6th St., Yongkang City, Tainan County (TW)

(*) Notice: Subject to any disclaimer, the term of this patent is extended or adjusted under 35 U.S.C. 154(b) by 0 days.

(21) Appl. No.: 11/520,247

(22) Filed: Sep. 13, 2006

(65) Prior Publication Data
US 2008/0062545 A1  Mar. 13, 2008

(51) Int. Cl.
G02B 5/08 (2006.01)
G02B 7/182 (2006.01)
B60R 1/06 (2006.01)

(52) U.S. Cl. .................. 359/841; 359/872; 248/478; 248/479

(58) Field of Classification Search .......... 359/872, 359/841; 248/477, 478, 479, 483
See application file for complete search history.

(56) References Cited

U.S. PATENT DOCUMENTS

| 4,125,244 A * | 11/1978 | Lukey ................ 248/475.1 |
| 4,789,232 A * | 12/1988 | Urbanek ................ 248/549 |
| 4,809,561 A * | 3/1989 | Tsuyama ................ 74/502.1 |
| 4,981,349 A * | 1/1991 | Tamiya et al. ............ 359/877 |
| 5,005,797 A * | 4/1991 | Maekawa et al. .......... 248/479 |
| 5,190,499 A * | 3/1993 | Mori et al. ............... 464/36 |
| 5,384,660 A * | 1/1995 | Oishi .................... 359/841 |
| 5,477,392 A * | 12/1995 | Mochizuki et al. ........ 359/841 |
| 5,639,054 A * | 6/1997 | Gerndt et al. ............ 248/478 |
| 6,109,586 A * | 8/2000 | Hoek .................... 248/476 |
| 6,116,743 A * | 9/2000 | Hoek .................... 359/871 |
| 6,220,716 B1 * | 4/2001 | Asaka .................... 359/871 |
| 6,322,221 B1 * | 11/2001 | van de Loo ............. 359/841 |
| 6,626,548 B2 * | 9/2003 | de Melo Neto .......... 359/841 |
| 6,742,756 B1 * | 6/2004 | Fimeri et al. ............ 248/479 |

* cited by examiner

Primary Examiner—Ricky D Shafer
(74) Attorney, Agent, or Firm—Alan Kamrath; Kamrath & Associates PA (57) ABSTRACT A sideview mirror includes multiple parts, wherein the mirror body, the washer, the spring, the support member, the bearing, the rotation member, and the mounting member are combined to form a window corner type sideview mirror, while the mirror body, the washer, the spring, the support member, and the mounting member are combined to form a car side body type sideview mirror. Thus, the window corner type sideview mirror only needs to provide the fixing member additionally to replace the bearing, the rotation member, and the mounting member to form the car side body type sideview mirror, so that the sideview mirror is both available for a window corner type sideview mirror and a car side body type sideview mirror.

6 Claims, 10 Drawing Sheets

PRIOR ART

UNIVERSAL SIDEVIEW MIRROR FOR CAR

BACKGROUND OF THE INVENTION

1. Field of the Invention

The present invention relates to a sideview mirror and, more particularly, to a universal sideview mirror for a car.

2. Description of the Related Art

Figure 9:
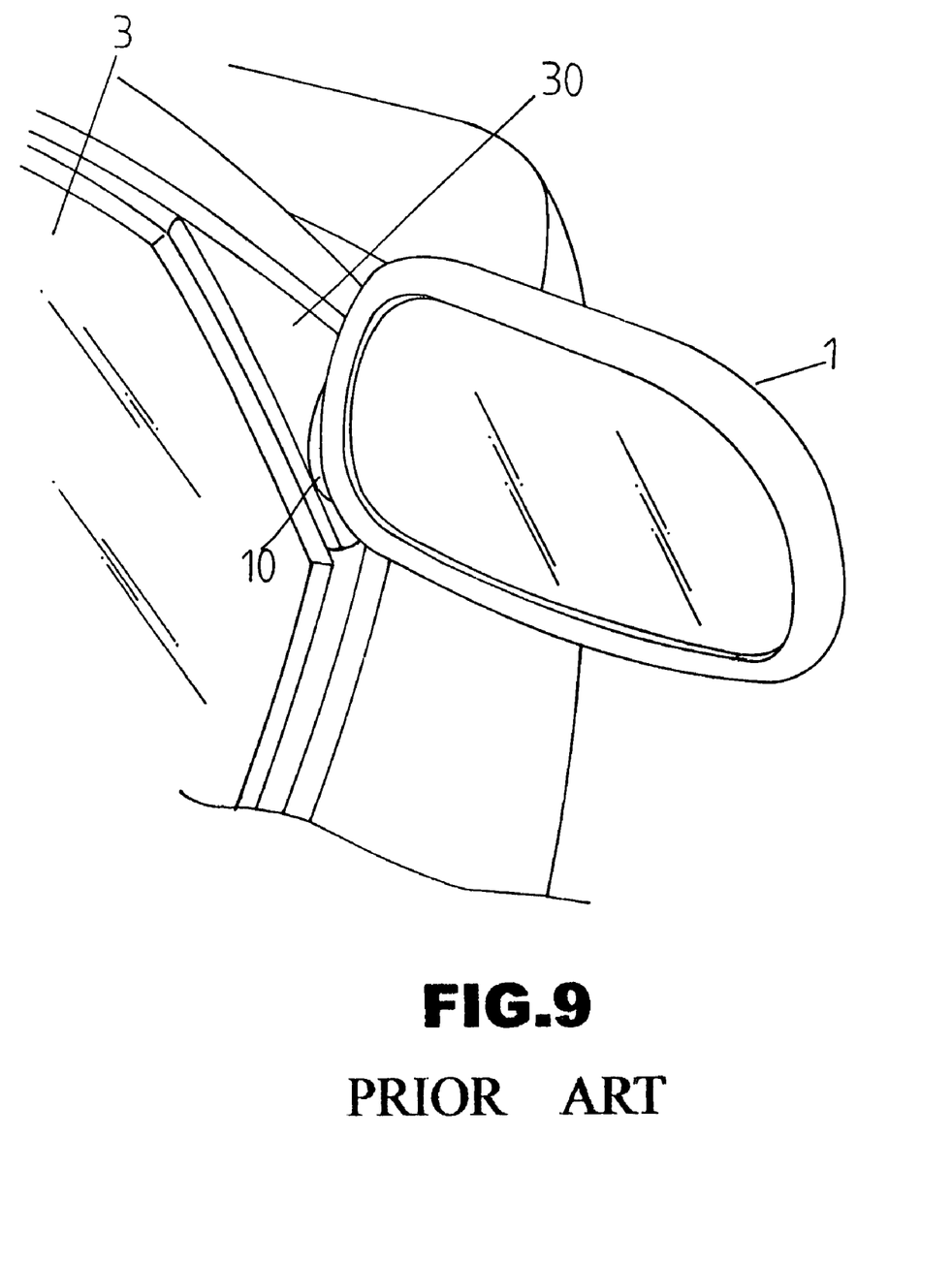
FIG. 9 is a perspective view of a conventional sideview mirror in accordance with the prior art.
Figure 10:
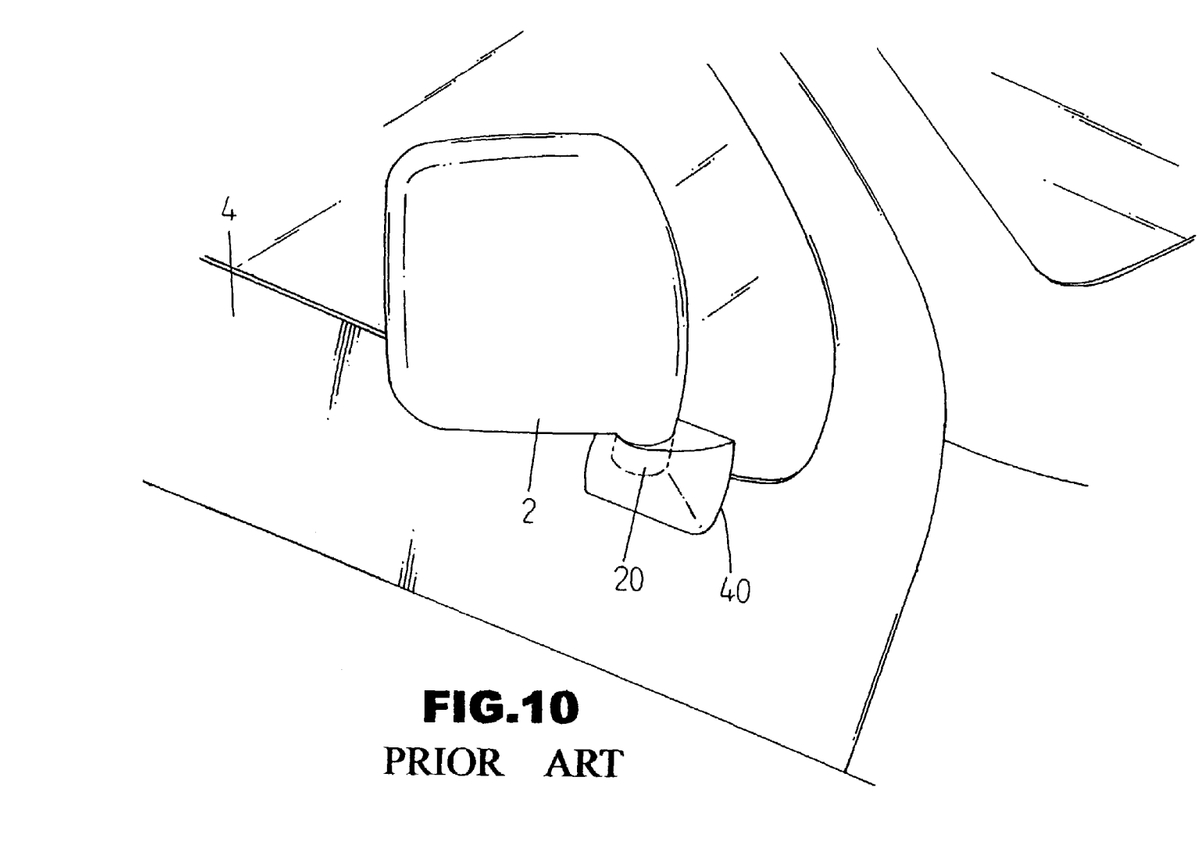
FIG. 10 is a perspective view of another conventional sideview mirror in accordance with the prior art.

A conventional window corner type sideview mirror 1 in accordance with the prior art shown in FIG. 9 is available for a support seat 30 of a window 3 of a car and comprises a mounting member 10 mounted on the support seat 30. A conventional car side body type sideview mirror 2 in accordance with the prior art shown in FIG. 10 is available for a support seat 40 of a side body 4 of a car and comprises a mounting member 20 mounted on the support seat 40.

However, the window corner type sideview mirror 1 and the car side body type sideview mirror 2 cannot be interchanged, thereby limiting the versatility of the sideview mirror. In addition, the consumer has to buy the window corner type sideview mirror 1 for a support seat 30 of a window 3 of a car or the car side body type sideview mirror 2 for a support seat 40 of a side body 4 of a car, thereby increasing the price of the sideview mirror. Further, the manufacturer has to provide the window corner type sideview mirror 1 and the car side body type sideview mirror 2, thereby increasing costs of fabrication and storage.

BRIEF SUMMARY OF THE INVENTION

In accordance with the present invention, there is provided a sideview mirror, comprising a mirror body, a washer, a spring, a support member, a bearing, a rotation member, a mounting member, and a fixing member. Thus, the mirror body, the washer, the spring, the support member, the bearing, the rotation member, and the mounting member are combined to form a window corner type sideview mirror, and the mirror body, the washer, the spring, the support member, and the mounting member are combined to form a car side body type sideview mirror.

The primary objective of the present invention is to provide a universal sideview mirror for a car.

Another objective of the present invention is to provide a sideview mirror, wherein the window corner type sideview mirror only needs to provide the fixing member additionally to replace the bearing, the rotation member, and the mounting member so as to form the car side body type sideview mirror, so that the sideview mirror has a universal function and is both available for a window corner type sideview mirror and a car side body type sideview mirror, thereby enhancing the versatility of the sideview mirror.

A further objective of the present invention is to provide a sideview mirror, wherein the sideview mirror functions as the window corner type sideview mirror and the car side body type sideview mirror, so that the consumer only needs to buy a single sideview mirror, thereby decreasing the price of the sideview mirror.

A further objective of the present invention is to provide a sideview mirror, wherein the manufacturer only needs to provide the window corner type sideview mirror and the fixing member additionally, thereby decreasing costs of fabrication and storage.

Further benefits and advantages of the present invention will become apparent after a careful reading of the detailed description with appropriate reference to the accompanying drawings.

DETAILED DESCRIPTION OF THE INVENTION

Figure 1:
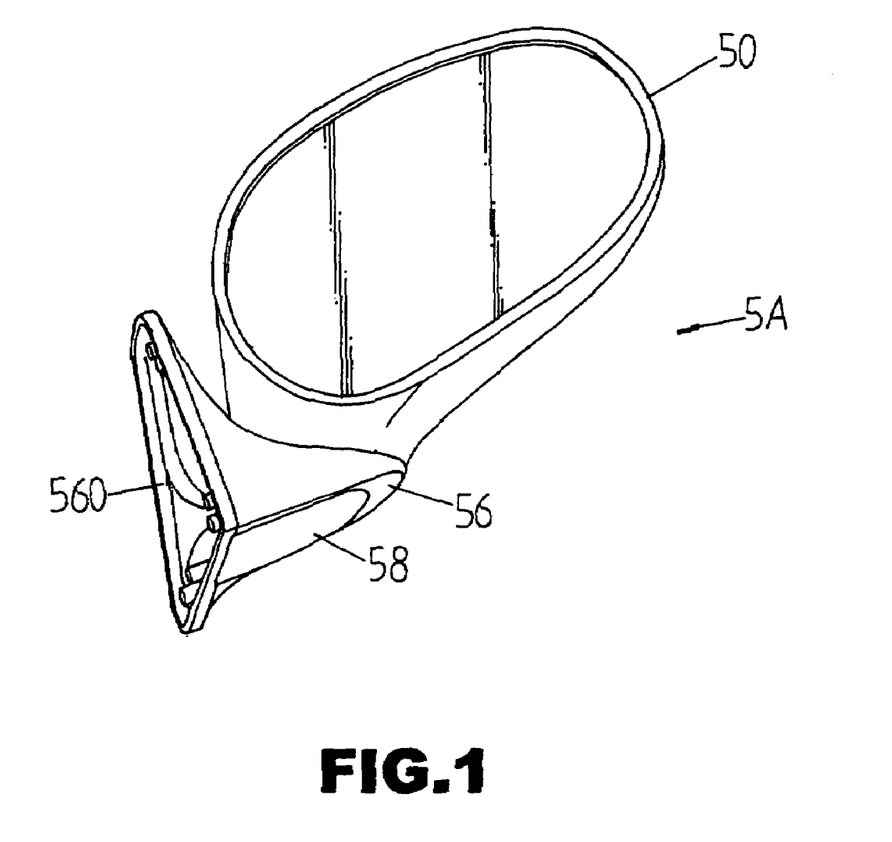
FIG. 1 is a perspective view of a sideview mirror in accordance with the preferred embodiment of the present invention.
Figure 2:
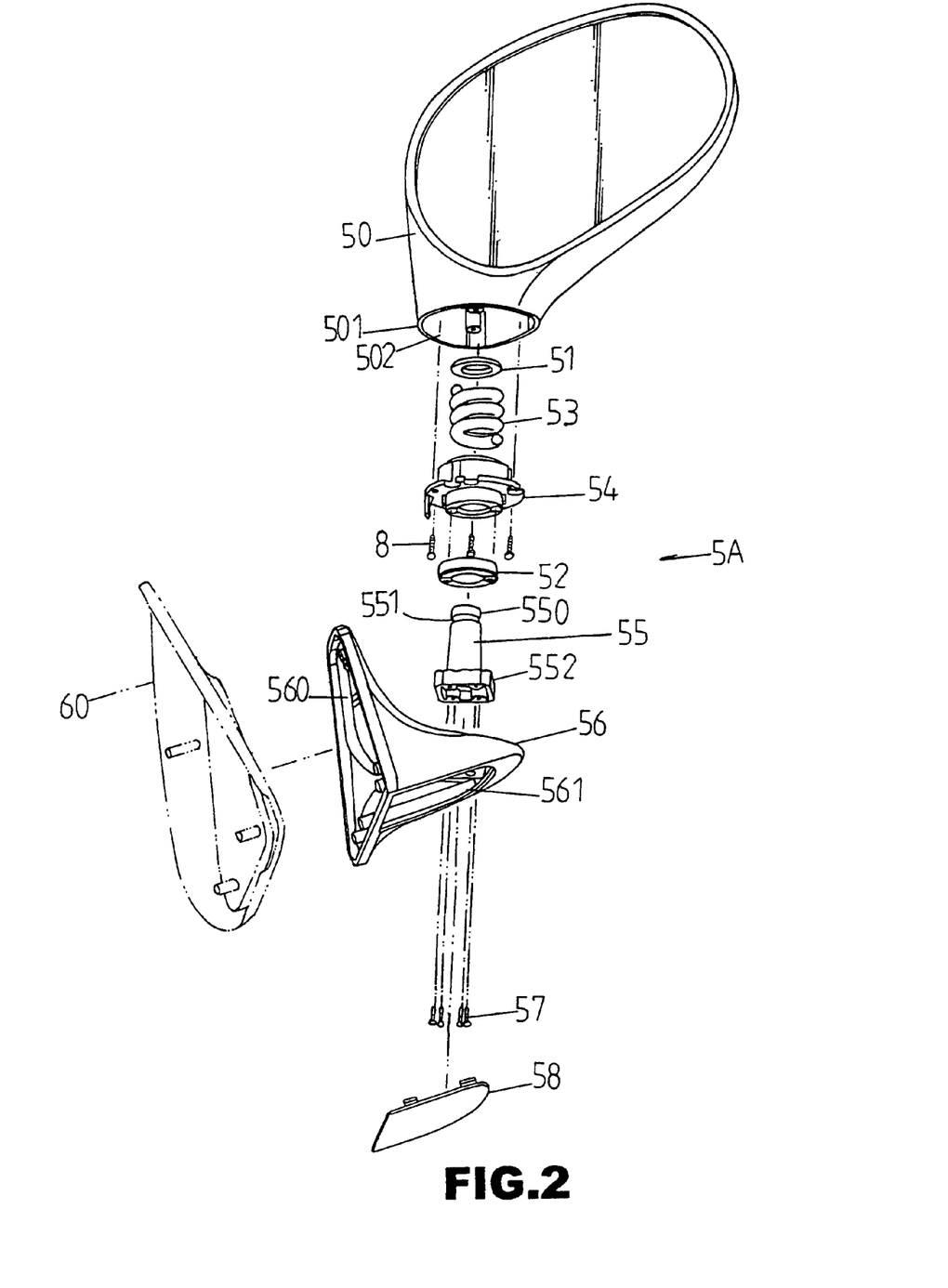
FIG. 2 is an exploded perspective view of the sideview mirror as shown in FIG. 1.
Figure 3:
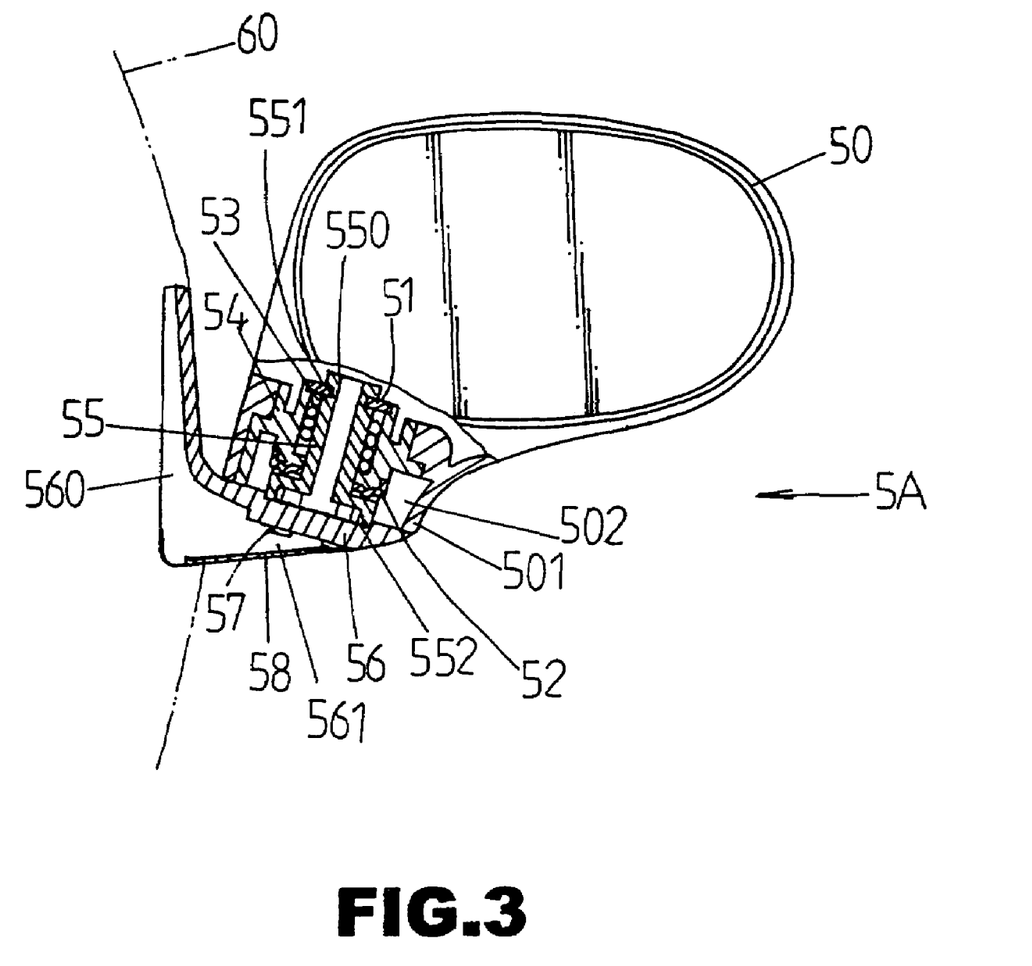
FIG. 3 is a plan cross-sectional view of the sideview mirror as shown in FIG. 1.

Referring to the drawings and initially to FIGS. 1-3, a sideview mirror for a car in accordance with the preferred embodiment of the present invention comprises a mirror body 50, a washer 51, a spring 53, a support member 55, a bearing 52, a rotation member 54, and a mounting member 56. In assembly, the mirror body 50, the washer 51, the spring 53, the support member 55, the bearing 52, the rotation member 54, and the mounting member 56 are combined to form a window corner type sideview mirror 5A.

The mounting member 56 has a side provided with a mounting portion 560 mounted on a support seat 60 of a window 6 (see FIG. 7) of a car and has a bottom formed with a receiving hole 561 to receive a cover 58. The support member 55 has an enlarged lower end 552 secured on a top of the mounting member 56 by a plurality of screws 57 and an upper end 550 formed with an annular groove 551 for mounting the washer 51. The rotation member 54 is rotatably mounted on the support member 55 and retained between the lower end 552 of the support member 55 and the washer 51. The spring 53 is mounted on the support member 55 and biased between the rotation member 54 and the washer 51. The bearing 52 is mounted on the support member 55 and located between the rotation member 54 and the lower end 552 of the support member 55. The mirror body 50 has a lower end 501 secured on the rotation member 54 by a plurality of screws 8 and rested on the top of the mounting member 56. The lower end 501 of the mirror body 50 has a receiving chamber 502 to receive the rotation member 54.

Figure 4:
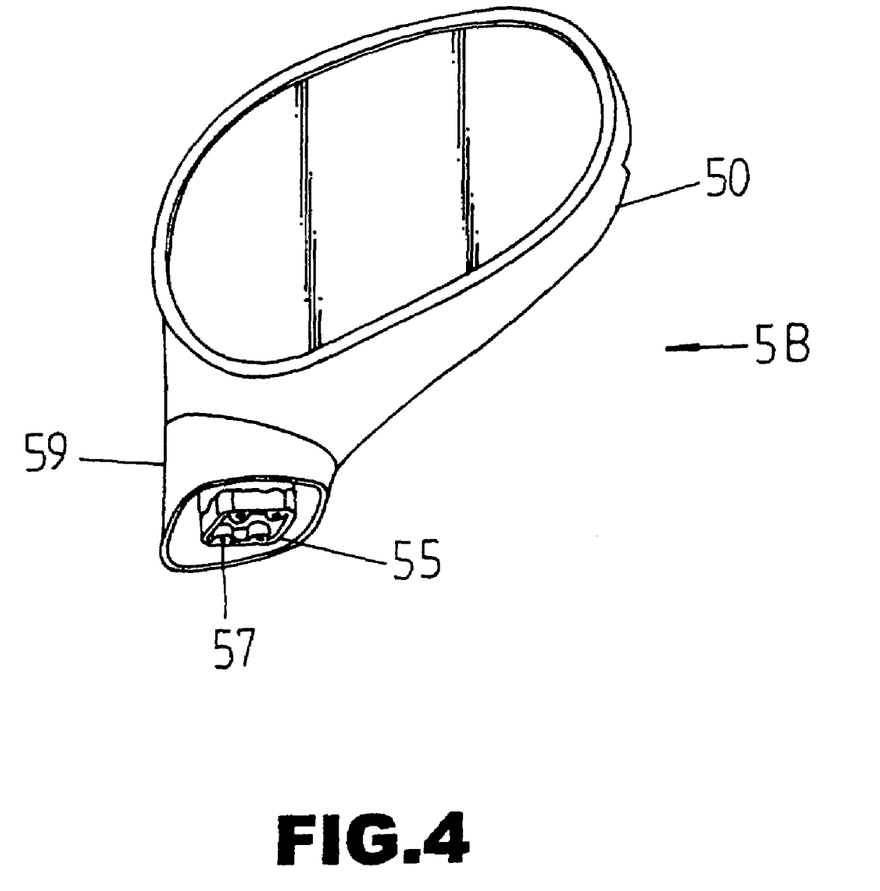
FIG. 4 is another perspective view of the sideview mirror in accordance with the preferred embodiment of the present invention.
Figure 5:
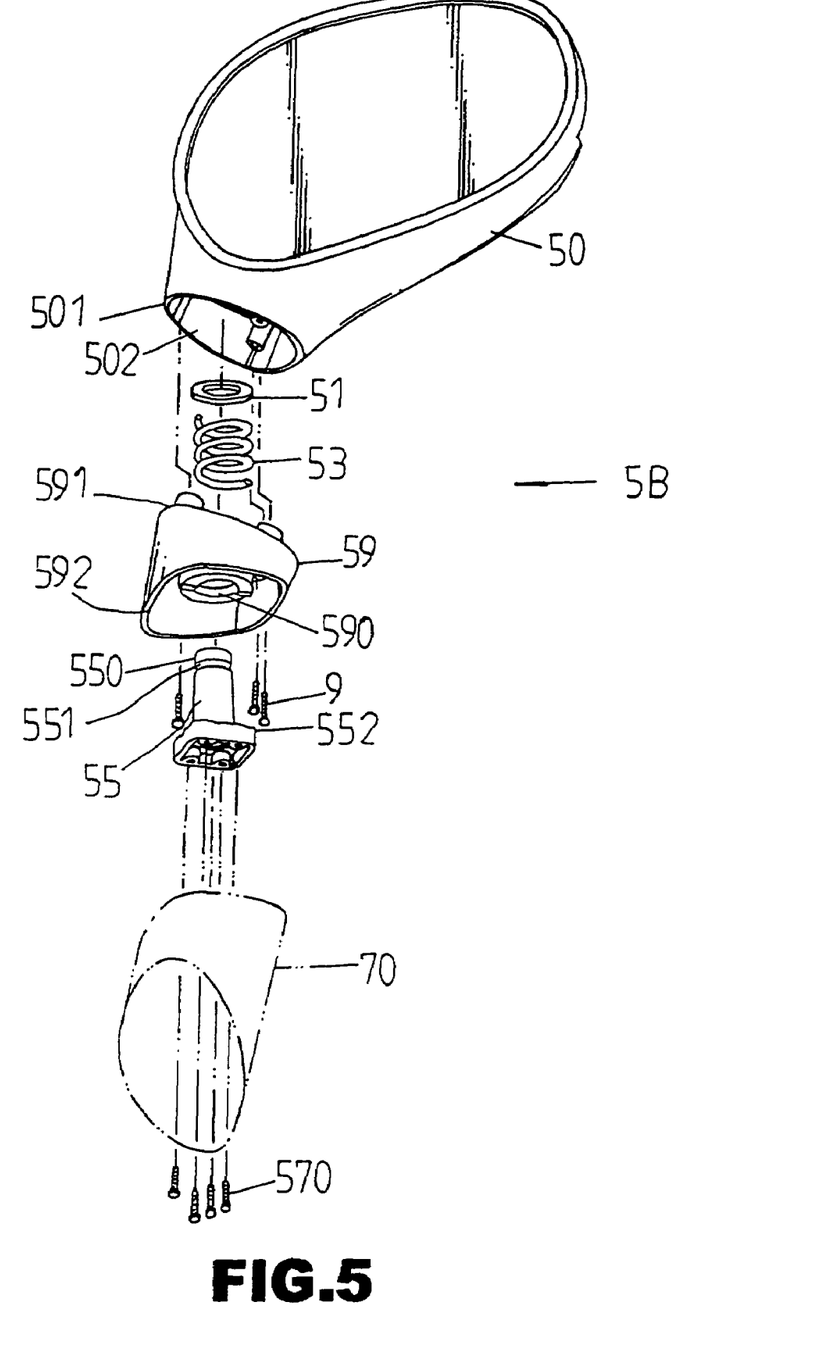
FIG. 5 is an exploded perspective view of the sideview mirror as shown in FIG. 4.
Figure 6:
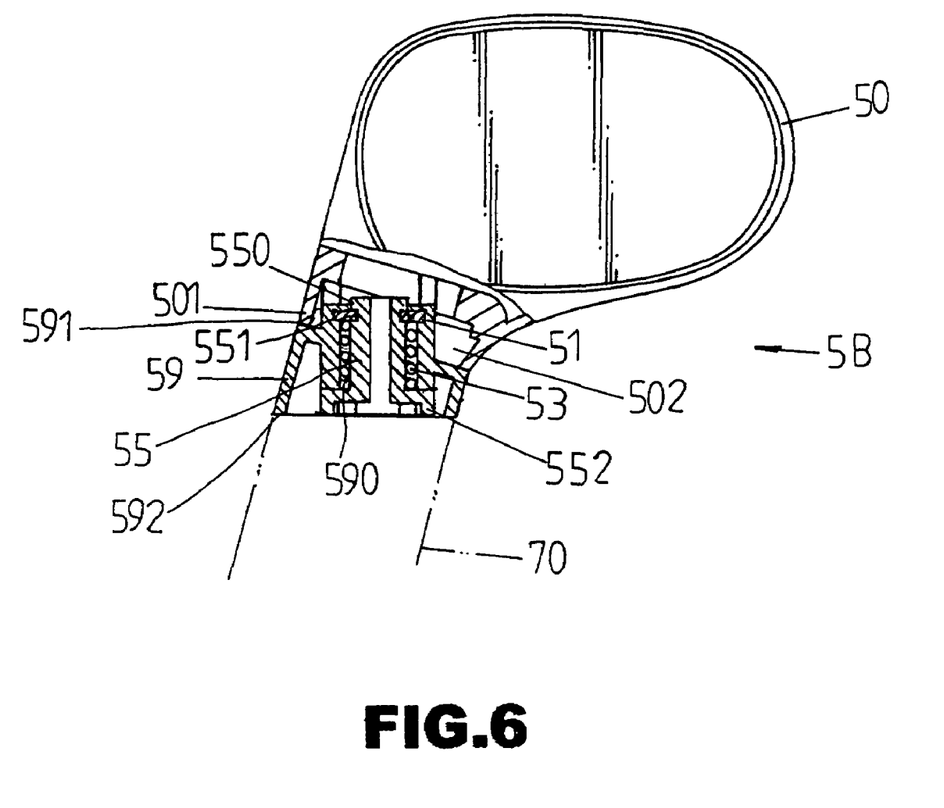
FIG. 6 is a plan cross-sectional view of the sideview mirror as shown in FIG. 4.

Referring to FIGS. 4-6, a sideview mirror for a car in accordance with the preferred embodiment of the present invention comprises a mirror body 50, a washer 51, a spring 53, a support member 55, and a fixing member 59. In assembly, the mirror body 50, the washer 51, the spring 53, the support member 55, and the fixing member 59 are combined to form a car side body type sideview mirror 5B.

The fixing member 59 has a lower end 592 mounted on a support seat 70 of a side body 7 (see FIG. 8) of a car and has an inside formed with a mounting hole 590 mounted on the support member 55 to receive the spring 53. The support member 55 has an enlarged lower end 552 secured on a top of the support seat 70 by a plurality of screws 570 and an upper end 550 formed with an annular groove 551 for mounting the washer 51. The spring 53 is mounted on the support member 55 and biased between the fixing member 59 and the washer 51. The mirror body 50 has a lower end 501 secured on an upper end 591 of the fixing member 59 by a plurality of screws 9. The lower end 501 of the mirror body 50 has a receiving chamber 502 to partially receive the upper end 591 of the fixing member 59.

Figure 7:
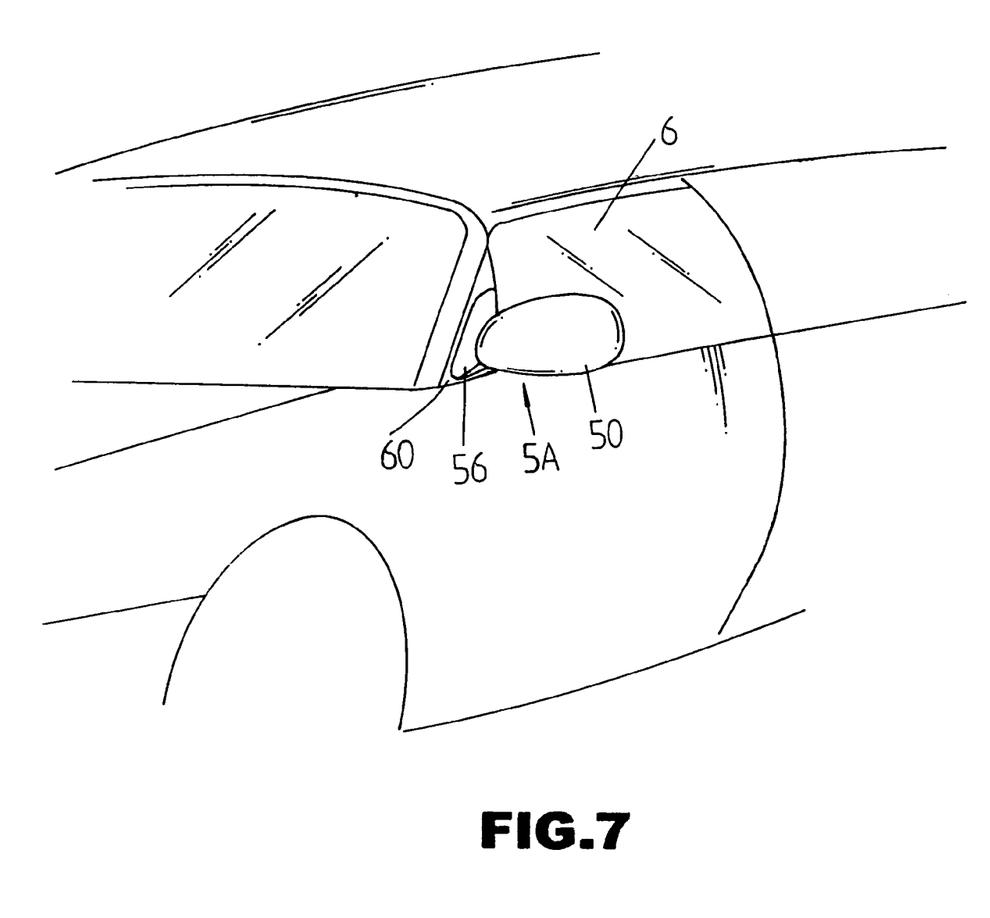
FIG. 7 is a perspective view showing usage of the sideview mirror as shown in FIG. 1.

As shown in FIG. 7, the window corner type sideview mirror 5A is available for a support seat 60 of a window 6 of a car.

Figure 8:
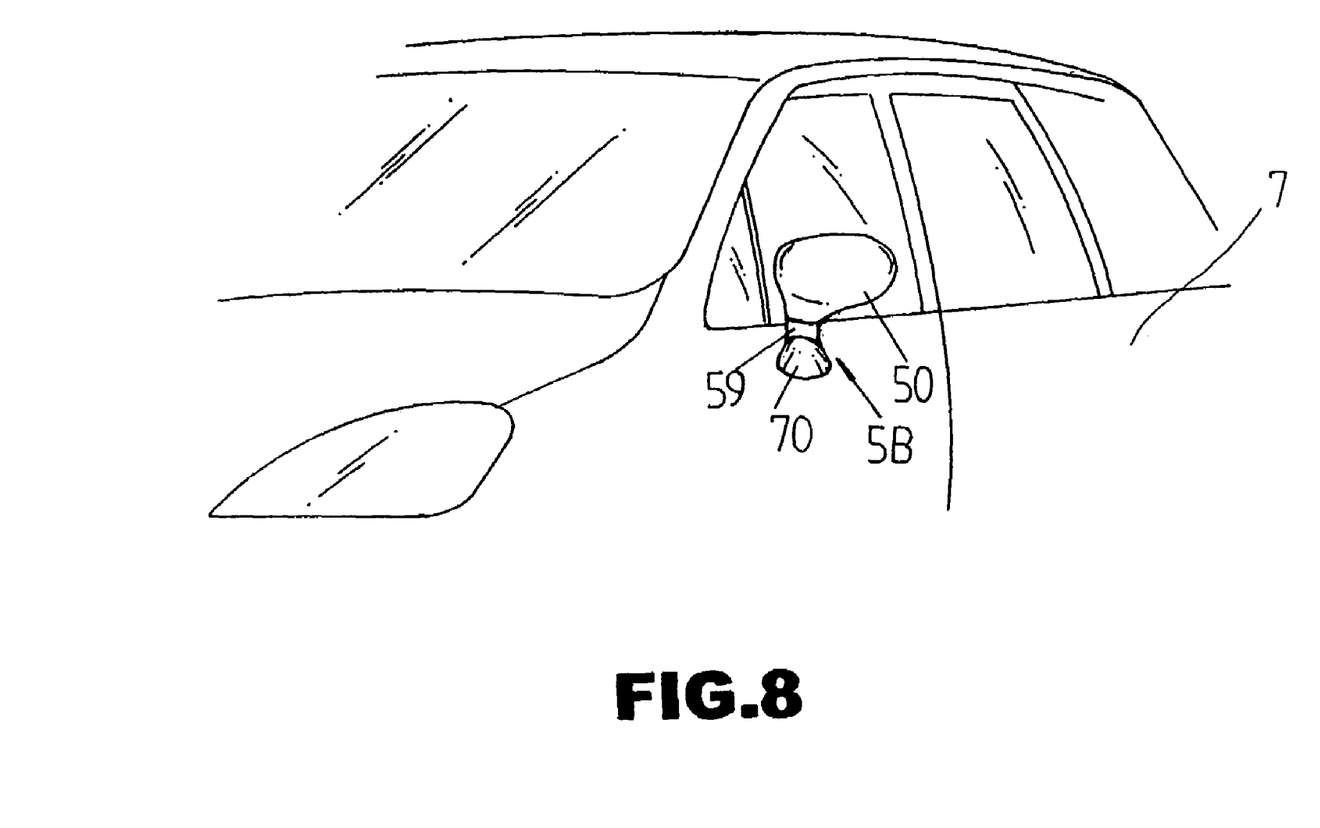
FIG. 8 is a perspective view showing usage of the sideview mirror as shown in FIG. 4.

As shown in FIG. 8, the car side body type sideview mirror 5B is available for a support seat 70 of a side body 7 of a car.

In conclusion, the window corner type sideview mirror 5A has common parts including the mirror body 50, the washer 51, the spring 53, the support member 55, and non-common parts including the bearing 52, the rotation member 54, and the mounting member 56, and the car side body type sideview mirror 5B has common parts including the mirror body 50, the washer 51, the spring 53, the support member 55, and a non-common part including the fixing member 59.

Accordingly, the window corner type sideview mirror 5A only needs to provide the fixing member 59 additionally to replace the bearing 52, the rotation member 54, and the mounting member 56 so as to form the car side body type sideview mirror 5B, so that the sideview mirror has a universal function and is both available for a window corner type sideview mirror and a car side body type sideview mirror, thereby enhancing the versatility of the sideview mirror. In addition, the sideview mirror functions as the window corner type sideview mirror 5A and the car side body type sideview mirror 5B, so that the consumer only needs to buy a single sideview mirror, thereby decreasing the price of the sideview mirror. Further, the manufacturer only needs to provide the window corner type sideview mirror 5A and the fixing member 59 additionally, thereby decreasing costs of fabrication and storage.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sideview mirror, comprising:
a minor body, a washer, a spring, a support member, a bearing, a rotation member, and a mounting member;
wherein the minor body, the washer, the spring, the support member, the bearing, the rotation member, and the mounting member are combined to form a window corner type sideview mirror;
the mounting member has a side provided with a mounting portion mounted on a support seat of a window of a car;
the support member is secured on a top of the mounting member;
the support member is in turn extended through the bearing, the rotation member, the spring and the washer and is combined with the washer;
the mirror body is combined with the rotation member to rotate the rotation member;
the rotation member is mounted on the support member and is rotatable relative to the mounting member;
the rotation member is available, for the window corner type sideview mirror;
the support member has an enlarged lower end secured on the top of the mounting member by a plurality of screws and rested on the mounting member and an upper end formed with an annular groove for mounting the washer to limit the bearing, the rotation member and the spring between the washer and the lower end of the support member;
the mirror body has a lower end secured on the rotation member by a plurality of screws and rested on the top of the mounting member to encompass the support member, the bearing, the rotation member, the spring and the washer.

2. The sideview mirror in accordance with claim 1, wherein the mounting member has a hollow inside and has a bottom formed with a receiving hole located opposite to the support member to receive a cover.

3. The sideview mirror in accordance with claim 1, wherein the rotation member is rotatably mounted on the support member and retained between the bearing and the spring.

4. The sideview mirror in accordance with claim 1, wherein the spring is mounted between the support member and the rotation member and biased between the rotation member and the washer.

5. The sideview mirror in accordance with claim 1, wherein the bearing is rotatably mounted on the support member and located between the rotation member and the lower end of the support member.

6. The sideview mirror in accordance with claim 1, wherein the lower end of the mirror body has a receiving chamber to receive the rotation member, the spring and the washer.

* * * * *